United States Patent [19]
Bowden

[11] 3,832,633
[45] Aug. 27, 1974

[54] TRANSISTOR BETA MEASURING INSTRUMENT

[76] Inventor: Ralph H. Bowden, 1800 Edgewood, Sioux Falls, S. Dak. 57107

[22] Filed: Feb. 22, 1972

[21] Appl. No.: 227,942

Related U.S. Application Data

[63] Continuation of Ser. No. 34,084, May 4, 1970, abandoned.

[52] U.S. Cl. ............................................. 324/158 T
[51] Int. Cl. ............................................. G01r 31/22
[58] Field of Search ................... 324/158 T, 158 D

[56] References Cited
UNITED STATES PATENTS

| | | | |
|---|---|---|---|
| 3,350,641 | 10/1967 | Lubkin et al. | 324/158 T |
| 3,594,640 | 7/1971 | Knanishu | 324/158 T |

OTHER PUBLICATIONS

Turner, R. P.; Basic Electronic Test Instruments; Holt, Rinehart, and Winston, Inc., New York, 1963; pg. 268–271.

*Primary Examiner*—Alfred E. Smith
*Assistant Examiner*—Ernest F. Karlsen
*Attorney, Agent, or Firm*—Edmond T. Patnaude

[57] ABSTRACT

The beta of a transistor is measured in two steps with a beta measuring instrument having an ammeter and a resistor with a resistance equal to the internal resistance of the ammeter without removing the transistor from its circuit, the first step being the calibration of the ammeter to full scale deflection by connecting it in the emitter circuit of the transistor with the resistor in the base circuit and applying an A.C. voltage across the emitter, and collector of the transistor of sufficient amplitude to cause full scale deflection of the ammeter with the transistor operating as a class B amplifier and the second step being the measurement of the beta by, after calibration, connecting the resistor in series with the emitter and the ammeter in series with the base to measure the base current.

2 Claims, 3 Drawing Figures

3,832,633

PATENTED AUG 27 1974

INVENTOR.
RALPH H. BOWDEN

TRANSISTOR BETA MEASURING INSTRUMENT

This application is a continuation of copending application U.S. Ser. No. 34,084, filed May 4, 1970, now abandoned, by Ralph H. Bowden.

The present invention generally relates to a method and test circuit for measuring the beta of a transistor while it is interconnected with other circuit components, and it relates more particularly, to a new and improved test circuit of this type which provides a more easily readable indication of beta.

The beta of a transistor is defined as the ratio of the collector current to the base current and may be expressed by the following equation:

$$B = I_c/I_b$$

Consequently, beta may be measured by applying a proper D.C. voltage bias to each of the electrodes of the transistor to maintain the collector unsaturated and measuring the collector and base currents. This technique does not, however, lend itself to in-circuit measurements, and therefore, other circuits have been devised to permit in-circuit beta measurements.

One such test circuit is described in the patent to Reich, U.S. Pat. No. 3,287,643. In using that circuit to measure the beta of a transistor, the collector current is adjusted to a predetermined, unsaturaged value and the base current is measured with an ammeter the scale of which is calibrated to read beta directly. Assuming that the meter provides substantially linear deflection, the scale is greatly compressed, and thus crowded, at the low current or high beta end of the scale. Consequently, even though the circuit is capable of relatively precise measurement of beta, it cannot, in reality, be so used unless a non-linear and thus expensive ammeter having an expanded scale is employed.

An object of this invention, therefore, is to provide a new and improved method and circuit for measuring the beta of a transistor.

Another object of this invention is to provide a new and improved beta measuring circuit suitable for use in test type equipment.

In accordance with the present invention there is provided a new and improved apparatus for measuring the beta of a transistor by comparing the emitter current to the base current. With this novel circuit the ammeter which is sequentially used to measure both the emitter and base currents may have a linear deflection characteristic and yet provide a substantially less crowded scale whereby a greater range of beta values may be visually read from the meter with a degree of accuracy greater than that attainable with prior art circuits employing standard ammeters.

The above-mentioned and other objects and features of this invention and the manner of attaining them will become more apparent, and the invention itself will be best understood by reference to the following description of the invention taken in connection with the accompanying drawings, wherein.

Figure 1:
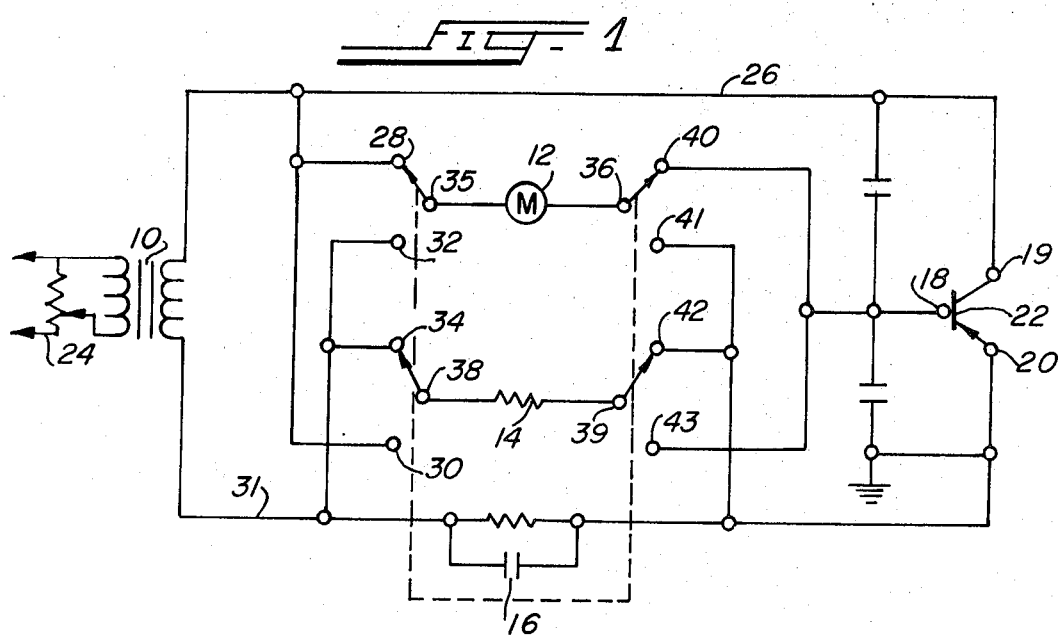
FIG. 1 is a schematic diagram of a circuit embodying one aspect of the present invention.

Referring now to the drawing and particularly to FIG. 1 thereof, a beta measuring test circuit comprises as its principal elements, an input transformer 10, a linear D.C. ammeter 12, a resistive impedance 14, a two-way control switch 16, and a plurality of terminal connectors 18, 19 and 20 for connecting the circuit to the transistor to be tested. As shown, a PNP transistor 22 is under test but it will be understood by those skilled in the art that the circuit of FIG. 1 is equally suited for measuring the beta of an NPN transistor without any modification.

Considered in greater detail, the primary winding of the transformer 10 is connected with a potentiometer 24 across a suitable source of A.C. voltage, such, for example, as a conventional 115-volt A.C. power line. The output voltage from the transformer 10 may thus be varied by adjustment of the potentiometer 24. One terminal of the transformer secondary winding is directly connected by a conductor 26 to the terminal connector 19 and also to terminals 28 and 30 of the switch 16. The other terminal of the transformer secondary winding is connected by a conductor 31 to terminals 32 and 34 of the switch 16.

In order to permit interchanging of the ammeter 12 and the impedance 14 to first a calibrate and then a beta read condition, the meter 12 is connected between a common contact 35 and a common contact 36 of the switch 16, and the impedance 14 is connected between a common contact 38 and a common contact 39 of the switch 16. Switch terminals 40 and 41 are respectively connected to the terminal connectors 18 and 20, and the switch terminals 42 and 43 are respectively connected to the terminal connectors 18 and 20, the latter terminal being grounded.

To calibrate the meter 12, the common switch 16 is thrown so that the common terminals 35 and 36 of the meter 12 are connected to the switch terminals 32 and 41 and the common terminals 38 and 39 of the impedance 14 are connected to the switch terminals 30 and 43 respectively. With the switch 16 in this position, the meter 12 is in the emitter circuit and the impedance 14 is in the base circuit of the transistor 22.

To read beta on the meter, the switch 16 is thrown so that the common terminals 35 and 36 of the meter 12 are connected to the switch terminals 28 and 40 respectively and the common terminals 38 and 39 of the impedance 14 are connected to the switch terminals 34 and 42 respectively as shown in FIG. 1. With the switch 16 in this position, the impedance 14 is in the emitter circuit and the meter 12 is in the base circuit of the transistor 22.

Figure 2:
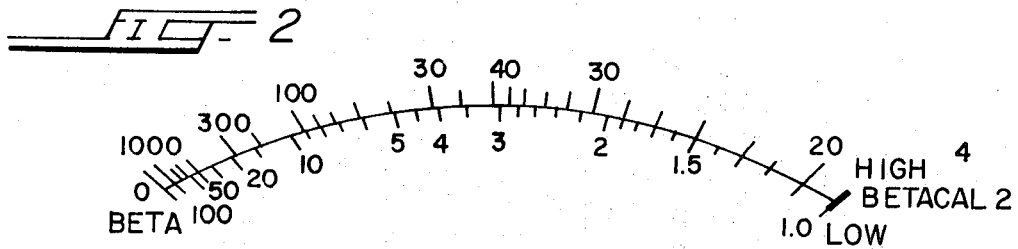
FIG. 2 illustrates a meter scale suitable for use with the circuit of FIG. 1.
Figure 3:
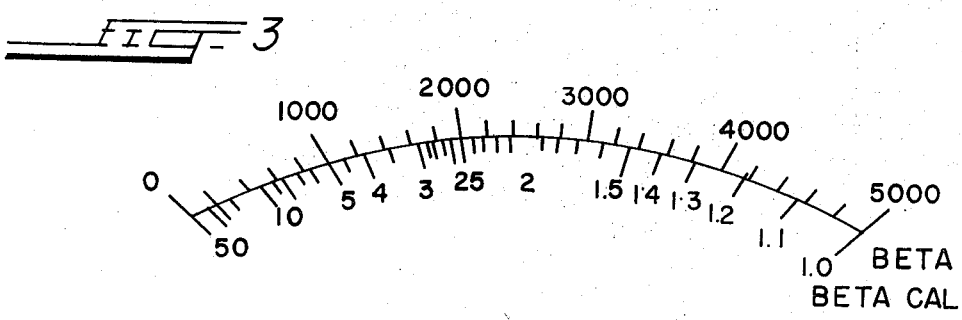
FIG. 3 illustrates a meter scale used with the prior art beta measuring circuit.

To read the beta of the transistor, an ammeter 12 having a dial bearing the scale shown in FIG. 2 is provided. A dial scale of the type included in prior art meters to measure the collector current of a transistor in a beta measuring instrument is shown in FIG. 3 for comparison with the dial scale in FIG. 2.

To understand this change, reference is again made to the equation for the beta of a transistor which is:

$$B = I_c/I_b$$

This equation may be rewritten as:

$$B = (I_e - I_b)/I_b$$

which in turn may be rewritten as:

$$B + 1 = I_e/I_b$$

By using the scale shown in FIG. 2, which is calculated using the above formula, the beta is directly readable.

In operation, the transistor 22 is connected into the circuit shown at FIG. 1 through the terminal connections 18, 19 and 20. Although a PNP transistor is shown in FIG. 1, an NPN transistor may also be connected into the circuit. Moreover, the transistor 22 may be part of a larger circuit in which it may have any configuration and still be tested with the circuit of FIG. 1.

With the transistor 22 in place, the A.C voltage applied through the transformer 10 causes the transistor 22 to conduct current at an amplitude below its saturation current. The collector reverse bias is supplied by the transistor itself by adjusting the emitter bias such that the collector current is smaller than the collector base saturation current level. With this emitter bias, the transistor 22 operates as a Class B amplifier. Since the transistor 22 is operating as a class B amplifier, it rectifies the A.C. current and applies a D.C. current to the meter 12 for the purpose of measuring beta.

To calibrate the meter 12 once the transistor 22 is connected in the circuit, the common switch 16 is thrown so that the common contacts 35 and 36 of the meter 12 are connected to the switch contacts 32 and 41 and the common contacts 38 and 39 are connected to the contacts 30 and 43. With the switch in this position, the resistor 14 is in series with the base of the transistor 22 and the meter 12 is in series with the emitter of the transistor 22. The meter 12 now reads the emitter current. The potentiometer 24 is adjusted so that the current through the transistor 22 is sufficient to provide a full scale deflection on meter 12.

Once the meter 12 has been calibrated with a full scale deflection, the switch 16 is thrown to the beta position in which the common terminals 35 and 36 of the meter 12 are connected to the terminals 28 and 40 of the switch 16 and the terminals 38 and 39 of the impedance 14 are connected to the switch terminals 34 and 42, as shown in FIG. 1. With the switch in this position, the same emitter current flows through the transistor 22 because the impedance 14 is equal to the internal impedance of the meter 12. The meter 12 now measures the base current and provides a direct reading for beta.

The reason beta is now readable on this scale is related to the position of the index numbers that are placed on the scale of the meter 12, which provides a linear deflection to current. Since the meter 12 is first adjusted at full scale deflection for the emitter current, it deflects to some portion of this full scale deflection when it is connected into the base circuit, which proportion is the ratio of the emitter current to the base current. The dial is calibrated to indicate this ratio plus the digit 1, and this value is beta.

A beta measuring instrument that maintains the emitter current constant rather than maintaining the collector current constant has an advantage of enabling a more precise reading of beta with a linear ammeter having a double scale, with one scale being expanded, that can be accomplished with a beta measuring instrument that maintains the collector current constant such as is the case with prior art beta measuring instruments.

The prior art beta measuring instrument lack precision because the numbers on the dial of the linear ammeter are crowded together over some ranges. The full scale deflection on such a meter is approximately 50 within the visible indications of the ratio between collector and base current. To obtain greater precision with such an instrument, more expensive nonlinear ammeters are necessary, which ammeters provide for a scale expanded near the larger beta values.

Although an embodiment of the invention has been described with some particularity, many modifications and variations are possible in the embodiment within the light of the above teachings. It is, therefore, to be understood that, within the scope of the appended claims, the invention may be practiced otherwise than as specifically described.

What is claimed is:

1. A test circuit for measuring the beta of a transistor comprising;
    a source of a.c. current having one terminal thereof directly connected to the collector of said transistor and having a second terminal;
    a linear ammeter having internal resistance;
    a resistor having a value of resistance substantially equal to that of said ammeter;
    switch means, having a first and a second position, for simultaneously connecting said ammeter between said one terminal and the base of said transistor and said resistor between said second terminal and the emitter of said transistor when in said first position and for simultaneously connecting said ammeter between said second terminal and the emitter of said transistor and said resistor between said one terminal and the base of said transistor when in said position; and
    said ammeter having a scale calibrated to indicate directly the value of beta when said switch is moved to one of said positions when said ammeter reads full scale when said switch is in the other of said positions.

2. A method of measuring the beta of a transistor having base, emitter and collector electrodes connected in circuit with other electrical components, comprising steps of
    providing a linear ammeter having a dial scale with index marks each indicating the ratio of twice the length of full scale deflection to the deflection from the beginning of the scale to the respective index marks minus one,
    connecting said ammeter in series with said emitter electrode,
    connecting a resistor having a resistance value equal to the internal resistance of said meter in series with said base electrode,
    applying a value of A.C. voltage between said emitter and collector electrodes to cause a predetermined reading by said ammeter,
    then mutually interchanging said ammeter and resistor while maintaining said value of voltage between said emitter and collector electrodes constant,
    whereby said meter directly indicates the beta value of said transistor.

* * * * *